United States Patent
Muto

(10) Patent No.: US 11,261,959 B2
(45) Date of Patent: Mar. 1, 2022

(54) SHIFTING CONTROL APPARATUS FOR VEHICLE

(71) Applicant: Toyota Jidosha Kabushiki Kaisha, Toyota (JP)

(72) Inventor: Yuji Muto, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 17/025,325

(22) Filed: Sep. 18, 2020

(65) Prior Publication Data

US 2021/0088132 A1 Mar. 25, 2021

(30) Foreign Application Priority Data

Sep. 19, 2019 (JP) .............................. JP2019-170908

(51) Int. Cl.
*F16H 61/02* (2006.01)

(52) U.S. Cl.
CPC . *F16H 61/0213* (2013.01); *F16H 2061/0223* (2013.01)

(58) Field of Classification Search
CPC ..... F16H 2061/0223; F16H 2061/0244; F16H 2061/0087; F16H 61/02
See application file for complete search history.

(56) References Cited

U.S. PATENT DOCUMENTS 5,031,100 A * 7/1991 Takahashi ........... F16H 61/0213
701/55
6,641,502 B2 * 11/2003 Heim .................. F16H 61/0213
477/37

FOREIGN PATENT DOCUMENTS

JP 2-3756 A 1/1990
JP 2000-242888 A 9/2000

* cited by examiner

*Primary Examiner* — Huan Le
(74) *Attorney, Agent, or Firm* — Oblon, McClelland, Maier & Neustadt, L.L.P.

(57) ABSTRACT

A shifting control apparatus for a vehicle includes a stepped automatic transmission configured to switch shifting positions based on a shifting pattern stored in advance, characterized by comprising: a sensory evaluation input portion configured to accept at least one sensory evaluation made by a vehicle occupant in the vehicle with regard to traveling of the vehicle; an evaluation tendency determining portion configured to determine an emphasis tendency in the sensory evaluation with regard to a phenomenon of an evaluation target with which the vehicle occupant feels dissatisfied based on the sensory evaluation accepted by the sensory evaluation input portion; and a shifting characteristic changing portion configured to change a shifting characteristic of the stepped automatic transmission based on the emphasis tendency in the sensory evaluation with regard to the phenomenon of the evaluation target determined by the evaluation tendency determining portion so as to improve the sensory evaluation.

19 Claims, 9 Drawing Sheets

|  | C1 | C2 | B1 | B2 | B3 | F1 |
|---|---|---|---|---|---|---|
| 1st | ○ |  |  | ◎ |  | △ |
| 2nd | ○ |  | ○ |  |  |  |
| 3rd | ○ |  |  |  | ○ |  |
| 4th | ○ | ○ |  |  |  |  |
| 5th |  | ○ |  |  | ○ |  |
| 6th |  | ○ | ○ |  |  |  |
| Rev |  |  |  | ○ | ○ |  |
| N |  |  |  |  |  |  |

◎ OPERATING AT ENGINE BRAKING
△ OPERATING ONLY AT DRIVING

FIG.6

| EVALUATION TARGET | INPUT INFORMATION | | SENSORY EVALUATION | EMPHASIS TENDENCY (DRIVING INTENTION) | | | | VARIOGRAM CHANGE CONTENT | |
|---|---|---|---|---|---|---|---|---|---|
| | | PHENOMENON | | FUEL CONSUMPTION | DRIVING PERFORMANCE | NV | | ROTATING DIRECTION | TORQUE DIRECTION |
| ENGINE | | ROTATION | TOO HIGH | ○ | | | | → | |
| | | | TOO LOW | | | | | ← | |
| | | SOUND | NOISY | | ○ | ○ | | → | ← |
| | | | QUIET | | | | | ← | → |
| AUTOMATIC TRANSMISSION | | UP-SHIFT | QUICK | | ○ | | | ← | |
| | | | SLOW | ○ | | | | → | |
| | | DOWN-SHIFT | QUICK | | ○ | | | | ← |
| | | | SLOW | | ○ | | | | → |
| VEHICLE | BEHAVIOR | ACCELERATION G | STRONG | | ○ | | | | ← |
| | | | WEAK | | ○ | | | | → |
| | | DECELERATION G | STRONG | | ○ | | | | |
| | | | WEAK | | ○ | | | | |
| | NOISE | ENGINE SOUND | NOISY | | | ○ | | → | ← |
| | | | QUIET | | ○ | | | ← | → |
| | | MUFFLED SOUND | NOISY | | | ○ | | ← | → |
| | VIBRATION | IN-VEHICLE VIBRATION | UNPLEASANT | | | ○ | | ← | → |

SHIFTING CONTROL APPARATUS FOR VEHICLE

This application claims priority from Japanese Patent Application No. 2019-170908 filed on Sep. 19, 2019, the disclosure of which is incorporated herein by reference in its entirety.

FIELD OF THE ART

The present invention relates to shifting control of a stepped automatic transmission provided between a vehicle engine and a drive wheel.

BACKGROUND ART

A vehicle including a stepped automatic transmission provided between the engine and the drive wheel uses a shifting pattern, i.e., a variogram, that is set in advance for control of shifting positions of the stepped automatic transmission. This shifting pattern is determined such that shifting control is performed to balance among, for example, vehicle fuel efficiency performance, vehicle acceleration driving performance, and vehicle noise/vibration (NV) performance so as to allow many users to accept the control. That is, this shifting pattern cannot incorporate shifting characteristics such that the vehicle can maximize, for example, one of the three performances described above to the greatest extent possible.

In order to cope with this problem, there is provided a shifting control apparatus that can change a vehicle speed and a tilt of a variogram in accordance with evaluation results obtained when a vehicle occupant, e.g., a driver, individually evaluates the shifting timing of a stepped automatic transmission. For example, this apparatus corresponds to the shifting control apparatus disclosed in Patent Document 1.

PRIOR ART DOCUMENT

Patent Document

[PATENT DOCUMENT 1] Japan Patent Publication No. H02-003756

SUMMARY OF THE INVENTION

Problem to be Solved by the Invention

According to Patent Document 1, the shifting timing of the stepped automatic transmission can be changed so as to reflect the evaluation made by the vehicle occupant with regard to the shifting timing of the stepped automatic transmission. However, this change does not reflect the intention of the vehicle occupant who attaches importance to one of the vehicle fuel efficiency performance, vehicle acceleration driving performance, and vehicle noise/vibration (NV) performance. As a consequence, the above change in shifting characteristic may become too large or too small contrary to the intention of the vehicle occupant.

The present invention has been made in view of the circumstances described above and has as its object to provide a shifting control apparatus for a vehicle which can change shifting characteristics of a stepped automatic transmission so as to reflect the intention of a vehicle occupant.

Solution to Problem

To achieve the above object, a first aspect of the present invention provides (a) a shifting control apparatus for a vehicle including a stepped automatic transmission configured to switch shifting positions based on a shifting pattern stored in advance, characterized by comprising: (b) a sensory evaluation input portion configured to accept at least one sensory evaluation made by a vehicle occupant in the vehicle with regard to traveling of the vehicle; (c) an evaluation tendency determining portion configured to determine an emphasis tendency in the sensory evaluation with regard to a phenomenon of an evaluation target with which the vehicle occupant feels dissatisfied based on the sensory evaluation accepted by the sensory evaluation input portion; and (d) a shifting characteristic changing portion configured to change a shifting characteristic of the stepped automatic transmission based on the emphasis tendency in the sensory evaluation with regard to the phenomenon of the evaluation target determined by the evaluation tendency determining portion so as to improve the sensory evaluation.

A second aspect of the present invention provides the shifting control apparatus for the vehicle recited in the first aspect of the invention, wherein the evaluation target includes at least one of an engine, the stepped automatic transmission which are mounted in the vehicle, and the vehicle, and the sensory evaluation pertains to at least one of a rotating speed of the engine, an engine sound, a shifting timing of the stepped automatic transmission, an acceleration of the vehicle, noise in the vehicle, and vibration in the vehicle.

A third aspect of the present invention provides the shifting control apparatus for the vehicle recited in the first or second aspect of the invention, wherein the shifting characteristic changing portion changes at least one of a rotating speed direction and a torque direction in the shifting pattern so as to improve the sensory evaluation made by the vehicle occupant.

A fourth aspect of the present invention provides the shifting control apparatus for the vehicle recited in any one of the first to third aspects of the invention, wherein the shifting characteristic changing portion determines, based on at least one of a determination history in a change target region of the shifting pattern and a peripheral region of the change target region, an amount of change in the shifting characteristic in the change target region.

A fifth aspect of the present invention provides the shifting control apparatus for the vehicle recited in the fourth aspect of the invention, wherein the shifting characteristic changing portion makes an amount of change in the shifting characteristic larger when a change direction of the shifting characteristic in the change target region coincides with a change direction of past changes within the change target region and the peripheral region of the change target region than the amount of change when the directions differ from each other.

A sixth aspect of the present invention provides the shifting control apparatus for the vehicle recited in the fourth or fifth aspect of the invention, wherein the shifting characteristic changing portion makes an amount of change in the shifting characteristic larger when a change direction of the shifting characteristic in the change target region coincides with a most common direction in a determination history in the change target region and a determination history in the peripheral region of the change target region than when the directions differ from each other.

A seventh aspect of the present invention provides the shifting control apparatus for the vehicle recited in any one of the fourth to sixth aspects of the invention, wherein the shifting characteristic changing portion makes an amount of change in the shifting characteristic in the change target region larger when there is no change history in the change target region than when there is a change history in the peripheral region of the change target region.

An eighth aspect of the present invention provides the shifting control apparatus for the vehicle recited in any one of the fourth to seventh aspects of the invention, wherein the shifting characteristic changing portion executes a change within the change target region when a traveling region corresponding to actual traveling of the vehicle is spaced apart from the change target region or while the vehicle is stopped.

Advantageous Effects of Invention

The shifting control apparatus for the vehicle according to the first aspect of the invention includes (a) the stepped automatic transmission configured to switch shifting positions based on the shifting pattern stored in advance, (b) the sensory evaluation input portion configured to accept at least one sensory evaluation made by a vehicle occupant in the vehicle with regard to traveling of the vehicle, (c) the evaluation tendency determining portion configured to determine the emphasis tendency in the sensory evaluation with regard to a phenomenon of the evaluation target with which the vehicle occupant feels dissatisfied based on the sensory evaluation accepted by the sensory evaluation input portion, and (d) the shifting characteristic changing portion configured to change the shifting characteristic of the stepped automatic transmission based on the emphasis tendency in the sensory evaluation with regard to the phenomenon of the evaluation target determined by the evaluation tendency determining portion so as to improve the sensory evaluation. This configuration changes the shifting characteristics of the automatic transmission so as to reflect the intention of the vehicle occupant, for example, the driving intention of the driver.

According to the shifting control apparatus for the vehicle in the second aspect of the invention, the evaluation target is at least one of the engine, the stepped automatic transmission which are mounted in the vehicle, and the vehicle, and the sensory evaluation pertains to at least one of a rotating speed of the engine, the engine sound, the shifting timing of the stepped automatic transmission, the acceleration of the vehicle, the noise in the vehicle, and the vibration in the vehicle. This configuration changes the shifting characteristics of the stepped automatic transmission so as to reflect the intention of the vehicle occupant, for example, the driving intention of the driver with regard to at least one of the rotating speed and the engine sound of the engine, the shifting timing of the stepped automatic transmission, the acceleration of the vehicle, and the noise in the vehicle and the vibration in the vehicle.

According to the shifting control apparatus for the vehicle in the third aspect of the invention, the shifting characteristic changing portion changes at least one of the rotating speed direction and the torque direction in the shifting pattern so as to improve the sensory evaluation made by the vehicle occupant. This configuration changes the shifting characteristics of the stepped automatic transmission so as to reflect the intention of the vehicle occupant, for example, the driving intention of the driver.

According to the shifting control apparatus for the vehicle in the fourth aspect of the invention, the shifting characteristic changing portion determines, based on at least one of the determination history in the change target region of the shifting pattern and the determination history in the peripheral region of the change target region, the amount of change in the shifting characteristic in the change target region. This configuration changes the shifting characteristics of the stepped automatic transmission so as to reflect the intention of the vehicle occupant, for example, the driving intention of the driver.

According to the shifting control apparatus for the vehicle in the fifth aspect of the invention, the shifting characteristic changing portion makes the amount of change in the shifting characteristic larger when the change direction of the shifting characteristic in the change target region coincides with the change direction of past changes within the change target region and the peripheral region of the change target region than the amount of change when the directions differ from each other. This configuration changes the amount of change within the change target region of the shifting pattern, and changes the shifting characteristics of the automatic transmission so as to reflect the intention of the vehicle occupant, for example, the driving intention of the driver.

According to the shifting control apparatus for the vehicle in the sixth aspect of the invention, the shifting characteristic changing portion makes the amount of change in the shifting characteristic larger when the change direction of the shifting characteristic in the change target region coincides with the most common direction in the determination history in the change target region and the determination history in the peripheral region of the change target region than when the directions differ from each other. This configuration changes the shifting characteristics of the stepped automatic transmission so as to reflect the intention of the vehicle occupant, for example, the driving intention of the driver.

According to the shifting control apparatus for the vehicle in the seventh aspect of the invention, the shifting characteristic changing portion makes the amount of change in the shifting characteristic in the change target region larger when there is no change history in the change target region than when there is the change history in the peripheral region of the change target region. This configuration changes the shifting characteristics of the stepped automatic transmission so as to reflect the intention of the vehicle occupant, for example, the driving intention of the driver.

According to the shifting control apparatus for the vehicle in the eighth aspect of the invention, the shifting characteristic changing portion executes the change within the change target region when the traveling region corresponding to actual traveling of the vehicle is spaced apart from the change target region or while the vehicle is stopped. With this operation, a change in the change target region of the shifting pattern does not influence the traveling of the vehicle.

FIG. 6 is a table showing a plurality of specific examples, in each of which the evaluation tendency determining portion of the electronic control apparatus in FIG. 1 determines the emphasis tendency of sensory evaluation with regard to the phenomenon of an evaluation target with which a vehicle occupant feels dissatisfied based on the sensory evaluation;

MODES FOR CARRYING OUT THE INVENTION

An embodiment of the present invention will be described in detail below with reference to the accompanying drawings. In the following embodiment, the drawings are simplified or modified when appropriate, and the dimensional ratios, shapes etc., of the respective portions are not necessarily depicted with accuracy.

Embodiment

Figure 1:
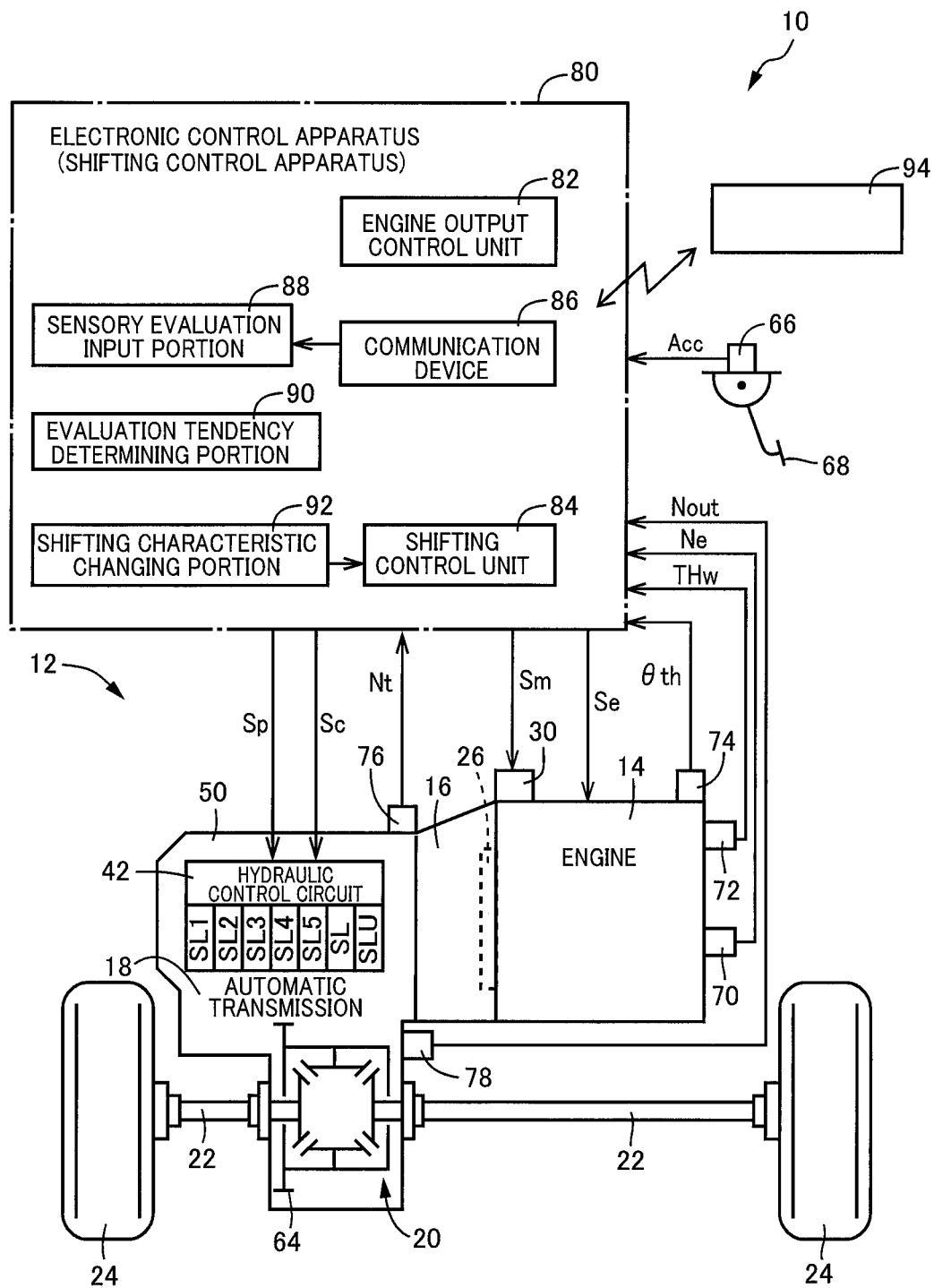
FIG. 1 is a schematic configuration diagram for explaining an example of a shifting control apparatus for a vehicle including a stepped automatic transmission and an electronic control apparatus that controls the apparatus, to which the present invention is applied.

FIG. 1 is a schematic view for explaining an example of a vehicle 10 including a drive unit 12 to which the present invention is applied. As shown in FIG. 1, the drive unit 12 is constituted by an engine 14, a torque converter 16, and a planetary gear stepped automatic transmission 18. An output of the engine 14 is transmitted to a drive wheel 24 through the torque converter 16, the automatic transmission 18, a differential gear unit 20, and right and left axles 22. The engine 14 as a drive power source corresponds to an internal-combustion engine such as a gasoline engine or diesel engine, which generates drive power by combustion of a fuel. The torque converter 16 corresponds to a hydraulic power transmission device.

Figures 2, 3:
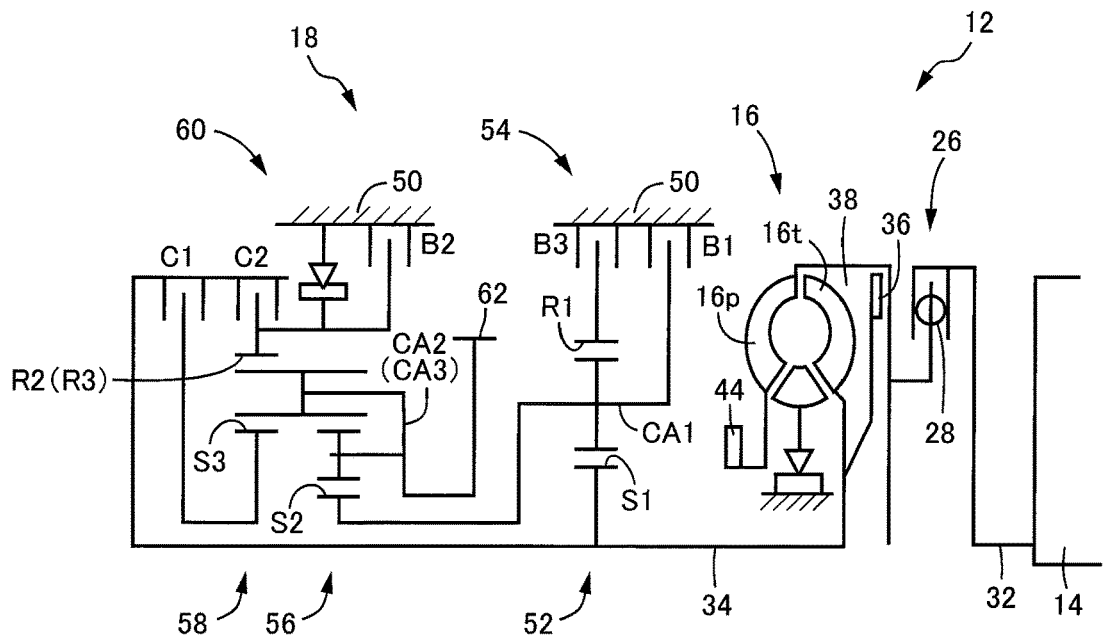
FIG. 2 is an outline diagram for explaining an example of the configuration of the stepped automatic transmission in FIG. 1.
FIG. 3 is an operation table for explaining the operation states of the frictional engagement devices at the time of establishing the respective gear positions of the stepped automatic transmission in FIG. 1.

FIG. 2 is an outline diagram showing the engine 14, the torque converter 16, and the automatic transmission 18. A damper 26 is provided between the engine 14 and the torque converter 16. The damper 26 absorbs torque fluctuations of the engine 14 and torsional vibrations. The damper 26 includes a plurality of compression coil springs 28 arranged around an axis of the damper 26.

The torque converter 16 has a pump impeller 16$p$ and a turbine impeller 16$t$, and includes a lockup clutch 36 that outputs the drive power transmitted from the engine 14 through the damper 26 to a turbine shaft 34 through a fluid and also directly transmits the drive power from the engine 14 to the turbine shaft 34 without through a fluid. The lockup clutch 36 is turned on and off by a solenoid valve SL of a hydraulic control circuit 42 provided in the automatic transmission 18 and slip-controlled by a linear solenoid valve SLU.

In a transmission case 50 as an non-rotating member mounted on a vehicle body, the automatic transmission 18 includes, on a common axis, a first shifting unit 54 having a single-pinion type first planetary gear unit 52 and a Ravigneaux-type second shifting unit 60 having a double-pinion type second planetary gear unit 56 and a single-pinion type third planetary gear unit 58, and outputs rotation of the turbine shaft 34 from an output rotating member upon changing speed of rotation. The turbine shaft 34 corresponds to an input member of the automatic transmission 18. In addition, the output rotating member 62 corresponds to an output member of the automatic transmission 18, and hence is an output gear, i.e., differential drive gear, which meshes with a driven gear (large-diameter gear) 64 of the differential gear unit 20 shown in FIG. 1 in this embodiment. Note that the automatic transmission 18 and the torque converter 16 are symmetrically arranged with respect to a centerline (axis). The outline diagram of FIG. 2 omits the lower half portion with respect to the centerline.

The automatic transmission 18 includes two clutches C1 and C2 (to be simply referred to as clutches C unless otherwise specified), three brakes B1 to B3 (to be simply referred to as brakes B unless otherwise specified), and a one-way clutch F1. The clutches C and the brakes B are engaged and disengaged to change coupling states between respective rotating elements (sun gears S1 to S3, carriers CA1 to CA3, and ring gears R1 to R3) of the first shifting unit 54 and the second shifting unit 60, thereby establishing six forward gear positions, including the first speed gear position "1st" to the sixth speed gear position "6th," and the reverse gear position "Rev".

The clutches C and brakes B are hydraulic frictional engagement devices such as multiple-disc clutches and brakes, which are engagement-controlled by hydraulic actuators. The engaged and disengaged states of these devices are switched by linear solenoid valves SLU1 to SLU5 of the hydraulic control circuit 42. In addition, for example, transient hydraulic pressures at the time of engagement and disengagement are controlled by these linear solenoid valves. FIG. 3 is an operation table for explaining operation states of the frictional engagement devices at the time of establishing the respective gear positions described above, with "○" indicating engagement, each blank column indicating disengagement, "⊚" indicating engagement only at the time of engine braking, and "Δ" indicating being in operation only at the time of driving.

Referring to FIG. 3, the forward gear positions include the first speed gear position "1st" obtained by engagement between the clutch C1 and the one-way clutch F1 or the brake B2, the second speed gear position "2nd" obtained by engagement between the clutch C1 and the brake B1, the third speed gear position "3rd" obtained by engagement between the clutch C1 and the brake B3, the fourth speed gear position "4th" obtained by engagement between the clutch C1 and the clutch C2, the fifth speed gear position "5th" obtained by engagement between the clutch C2 and the brake B3, and the sixth speed gear position "6th" obtained by engagement between the clutch C2 and the brake B1. In addition, the reverse gear position "Rev" is obtained by engagement between the brake B2 and the brake B3. The neutral position "N" for interrupting drive power transmission is obtained by disengaging the clutches C1 and C2 and the brakes B1 to B3. A transmission gear ratio γ of each gear position (=input rotating speed Nt of turbine shaft 34/output rotating speed Nout of output rotating member 62) is determined in accordance with each of transmission gear ratios (=number of teeth of sun gear/number of teeth of ring gear) ρ1, ρ2, and ρ3 of the first planetary gear unit 52, the second planetary gear unit 56, and the third planetary gear unit 58. The transmission gear ratio γ of the first speed gear position "1st" is the largest, and the transmission gear ratio decreases toward a high-speed side (sixth speed gear position "6th" side).

As shown in FIG. 1, the drive unit 12 described above includes an electronic control apparatus 80 (corresponding to a shifting control apparatus according to the present invention). The electronic control apparatus 80 includes a so-called microcomputer including a CPU, RAM, ROM, and input/output interface. The CPU performs signal processing in accordance with programs stored in the ROM in advance while using the temporary storage function of the RAM to execute output control of the engine 14, shifting control of the automatic transmission 18, ON/OFF control of the lockup clutch 36, etc. The electronic control apparatus 80 is separately formed for engine control, shifting control, etc., as needed.

For example, the following signals are supplied to the electronic control apparatus 80: an accelerator operation amount signal indicating an accelerator opening degree Acc that is an operation amount of an accelerator pedal 68 detected by an accelerator opening degree sensor 66; a signal indicating an engine rotating speed Ne that is rotating speed of the engine 14 detected by an engine rotating speed sensor 70; a signal indicating a cooling water temperature THw of the engine 14 detected by a cooling water temperature sensor 72; a throttle valve opening degree signal indicating an electronic throttle valve opening degree θth detected by a throttle valve opening degree sensor 74; a signal indicating the input rotating speed Nt that is the rotating speed of the turbine shaft 34 detected by a turbine rotating speed sensor 76; and a vehicle speed signal corresponding to a vehicle speed V that is the output rotating speed Nout of the output rotating member 62 detected by a vehicle speed sensor 78.

The electronic control apparatus 80 outputs an engine control signal Se such as a drive signal to a throttle actuator that operates the electronic throttle valve opening degree θth, an ignition signal for commanding an ignition timing of the engine 14, and a fuel supply amount signal for controlling the amount of fuel supplied to the engine 14 by a fuel injection device that supplies a fuel into an intake pipe or cylinder of the engine 14 or stops the supply. In addition, when starting the engine 14, the electronic control apparatus 80 outputs, to a starter motor 30, a motor drive signal Sm for cranking the engine 14. The electronic control apparatus 80 also outputs a shifting control signal Sc for controlling the linear solenoid valves SLU1 to SLU5 in the hydraulic control circuit 42 to switch between the gear positions (including the neutral position "N") of the automatic transmission 18, a lockup control signal Sp for driving the solenoid valve SL and the linear solenoid valve SLU which control ON/OFF of the lockup clutch 36 or a slip amount ΔN, etc.

The electronic control apparatus 80 functionally includes an engine output control unit 82, a shifting control unit 84, a communication device 86, a sensory evaluation input portion 88, an evaluation tendency determining portion 90, and a shifting characteristic changing portion 92, etc. The engine output control unit 82 (engine output control means) executes output control of the engine 14 by, for example, performing opening/closing control of the electronic throttle valve using the throttle actuator in accordance with the accelerator opening degree Acc so as to increase the engine output with an increase in the accelerator opening degree Acc, controlling the amount of fuel injected by the fuel injection device for fuel injection control, and controlling the ignition timing of an ignition device such as an ignitor for ignition timing control.

The shifting control unit 84 (shifting control means) performs shifting control, neutral control, etc., of the automatic transmission 18. The shifting control unit 84 refers to the actual vehicle speed V and accelerator opening degree Acc in accordance with a shift map, i.e., the shifting pattern (variogram), set in advance in, for example, a two-dimensional coordinate system of the vehicle speed V and the accelerator opening degrees Acc shown in, for example, FIG. 4, thereby performing shifting control of the first speed gear position "1st" to the sixth speed gear position "6th," obtaining the reverse gear position "Rev," or obtaining the neutral position "N" by disengaging all the clutches C and brakes B.

Figure 4:
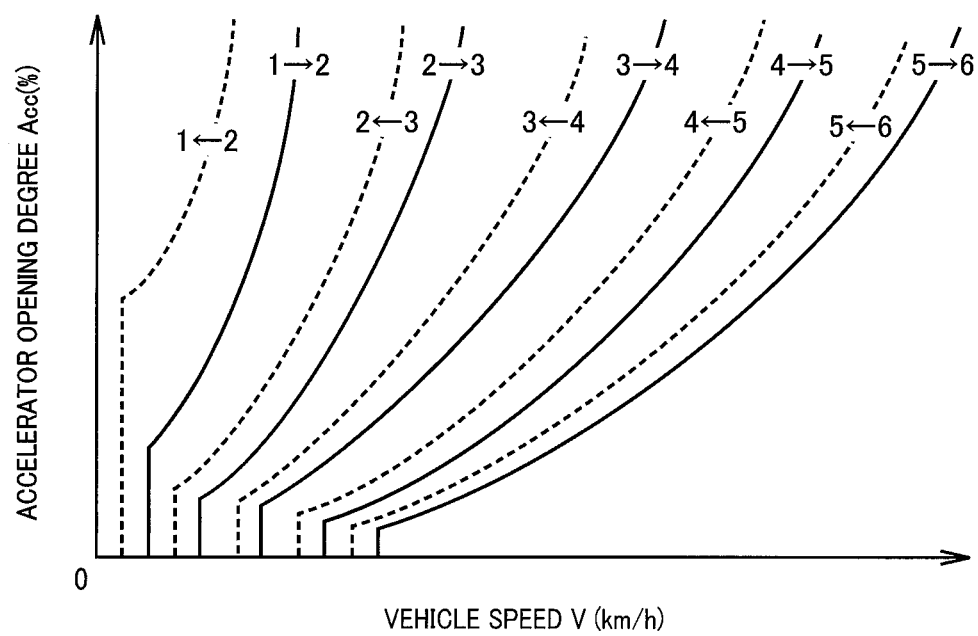
FIG. 4 is a variogram for controlling the shifting of the stepped automatic transmission in FIG. 1.

As shown in FIG. 4, the shift map is formed as a two-dimensional map in which a plurality of variograms constituted by the vehicle speed V and the accelerator opening degrees Acc and corresponding to respective shifting positions are set. The respective variograms are indicated by up-shift lines indicated by solid lines and down-shift lines indicated by broken lines. When a traveling state of the vehicle changes to a position straddling any one of the variograms, shifting is executed to the shifting position corresponding to that variogram. For example, when the accelerator opening degree Acc increases as the driver depresses the accelerator pedal, the shifting position straddles the down-shift line from the third speed gear position (3rd) to the second speed gear position (2nd) indicated by the broken line. Accordingly, the shifting control unit 84 determines a down-shift operation from the third speed gear position to the second speed gear position.

When the vehicle speed V decreases, the shifting position straddles the down-shift line from the third speed gear position (3rd) to the second speed gear position (2nd) indicated by the broken line, and hence the shifting control unit 84 determines the down-shift operation from the third speed gear position to the second speed gear position. When the down-shift operation is performed from the third speed gear position to the second speed gear position, the brake B1 is engaged, and the brake B3 is disengaged, as indicated by an engagement operation table in FIG. 3. Accordingly, for example, in the down-shift operation from the third speed gear position to the second speed gear position, the brake B1 serves as an engagement side friction device, and the brake B3 serves as a disengagement side friction device. That is, the automatic transmission 18 achieves shifting by engagement of the engagement side friction device and disengagement of the disengagement side friction device.

The communication device 86 performs communication with a portable electronic information terminal device such as a smartphone, a vehicle-mounted terminal device, and a vehicle-mounted speech input device via a wireless, infrared, or wired connection. This communication makes the communication device 86 receive, via wireless communication, OTA (Over The Air) such as optical communication, or wired communication, sensory evaluation information that corresponds to, for example, the dissatisfaction felt by a vehicle occupant, e.g., a driver, with regard to a phenomenon that has occurred in the vehicle 10 due to stepped shifting of the automatic transmission 18, and is input to the portable electronic information terminal device, the vehicle-mounted terminal device, the vehicle-mounted speech input device, etc., by the vehicle occupant, e.g., the driver. The sensory evaluation input portion 88 (accepts) reads sensory evaluation information received by the communication device 86, e.g., a sensory evaluation corresponding to the dissatisfaction felt by the vehicle occupant with regard to a phenomenon that has occurred in the vehicle 10 due to the stepped shifting of the automatic transmission 18. The portable electronic information terminal device such as a smartphone is convenient for the vehicle occupant who is traveling by automated driving to perform an input operation. The vehicle-mounted speech input device is convenient for the driver who is driving the vehicle 10 to perform an input operation.

Figure 5:
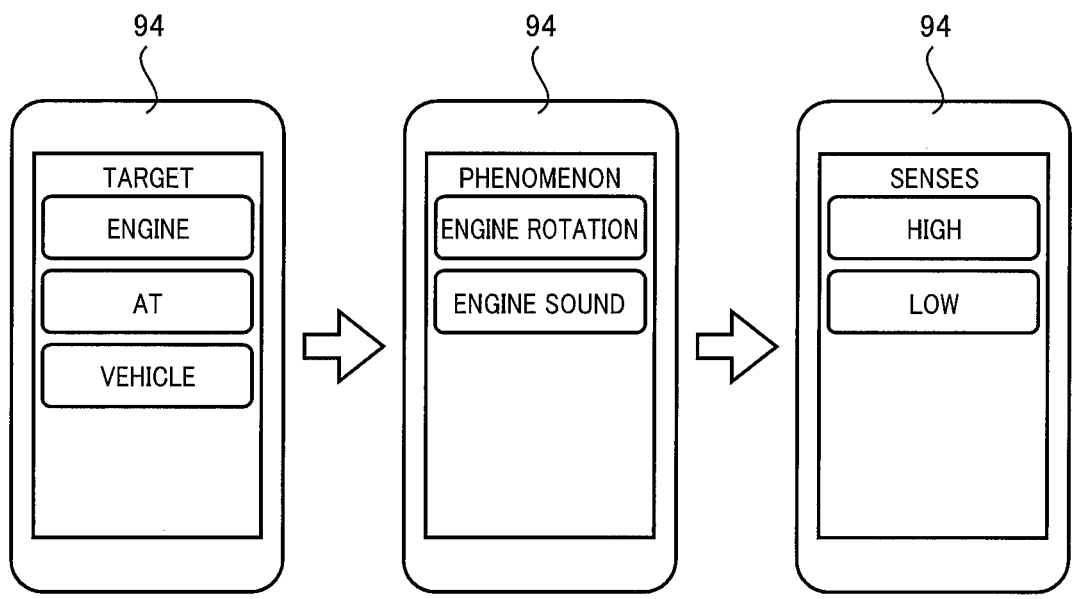
FIG. 5 is a view showing an evaluation target with which a vehicle occupant feels dissatisfied, an evaluation tendency with regard to the behavior of the evaluation target, and the change direction of a variogram corresponding to the evaluation tendency according to the electronic control apparatus in FIG. 1.

FIG. 5 is a view for explaining a case in which a sensory evaluation corresponding to the dissatisfaction felt by a vehicle occupant, e.g., a driver, with regard to a phenomenon that has occurred in the vehicle 10 due to the stepped shifting of the automatic transmission 18 is input by using a smartphone 94 linked to the communication device 86 of the electronic control apparatus 80 with a code signal. The smartphone 94 on the left side of FIG. 5 displays a touch panel screen displaying "engine," "AT (automatic transmission)," and "vehicle" to prompt for selective touch input of a sensory evaluation target. The smartphone 94 in the middle of FIG. 5 displays the next touch panel screen when "engine" described above is input. This touch panel screen displays "engine rotation" and "engine sound" to prompt for selective touch input of a phenomenon. The smartphone 94 on the right side of FIG. 5 displays touch panel screen displaying "high" and "low" to prompt for touch input of a sensory evaluation. For example, assume that "engine" is selected as a target, "engine rotation" is selected as a phenomenon, and "high" is selected as the sensory evaluation. In this case, the sensory evaluation input portion 88 reads the sensory evaluation indicating that the engine rotation is too high.

The evaluation tendency determining portion 90 determines the emphasis tendency in sensory evaluation with regard to a phenomenon of an evaluation target with which a vehicle occupant, e.g., a driver, feels dissatisfied based on the sensory evaluation read (i.e. accepted) by the sensory evaluation input portion 88. FIG. 6 shows a plurality of specific examples.

Referring to FIG. 6, the evaluation target column in the input information column provides the engine 14 mounted in the vehicle 10, the automatic transmission 18 mounted in the vehicle 10, and the vehicle 10 itself. The phenomenon column in the input information column provides "rotation" and "sound" pertaining to the engine 14. The sensory evaluations "too high" and "too low" and the sensory evaluations "noisy" and "quiet" are respectively set with respect to "rotation" and "sound." In addition, "up-shift" and "down-shift" are provided for the automatic transmission 18, and the sensory evaluations "quick" and "slow" are respectively set with respect to "up-shift" and "down-shift." Vehicle "behavior" ("acceleration G" and "deceleration G"), "noise" ("engine sound"), and "vibration" ("muffled sound" and "in-vehicle noise") are provided with respect to the vehicle 10. The sensory evaluations "strong" and "weak" are respectively set with respect to "acceleration G" and "deceleration G"; the sensory evaluations "noisy" and "quiet," are set with respect to "engine sound"; the sensory evaluation "noisy" are set with respect to "muffled sound"; and the sensory evaluation "unpleasant" are set with respect to "in-vehicle vibration."

Referring to FIG. 6, the variogram change content column indicates directions of changes (change directions) of rotations (rotation speed) and torques of variograms by using arrows. For example, when the sensory evaluation "too high" or "too low" is provided for "rotation," the evaluation tendency determining portion 90 determines a fuel-consumption-oriented or vehicle performance-oriented emphasis tendency, i.e., driving intention, and changes the variogram in a direction to decrease or increase the engine rotating speed by a predetermined amount based on the emphasis tendency so as to suppress the sensory evaluation, i.e., improve the sensory evaluation.

For example, upon knowing the sensory evaluation "strong (too strong)" or "weak (too weak)" with regard to the acceleration G among the vehicle behaviors, the evaluation tendency determining portion 90 determines that the driver has a vehicle performance-oriented emphasis tendency, i.e., driving intention, and changes the variogram by a predetermined amount in a direction to increase or decrease the engine output torque based on the emphasis tendency so as to suppress the sensory evaluation, i.e., improve the sensory evaluation.

For example, upon knowing, with regard to the vibration of the vehicle, the sensory evaluation "noisy" with regard to "muffled sound" or the sensory evaluation "unpleasant" with regard to "in-vehicle vibration," the evaluation tendency determining portion 90 determines that the driver has a vehicle noise/vibration (NV)-oriented emphasis tendency, i.e., driving intention, and changes the variogram by a predetermined amount in a direction to increase the engine rotating speed and decrease engine torque based on an evaluation (emphasis) tendency so as to suppress the sensory evaluation, i.e., improve the sensory evaluation.

Assume that the evaluation tendency determining portion 90 determines a fuel-consumption-oriented emphasis tendency, i.e., driving intention upon knowing the sensory evaluation "too high" with regard to the engine rotation, determines the vehicle performance-oriented emphasis tendency, i.e., driving intention upon knowing the sensory evaluation "strong (too strong)" or "weak (too weak)" with regard to the acceleration G as the above vehicle behavior, and determines the vehicle noise/vibration (NV)-oriented emphasis tendency, i.e., driving intention upon knowing the sensory evaluation "noisy" or "unpleasant" with regard to the above vehicle vibration/muffled sound or in-vehicle vibration. In this case, when determining such a tendency, the evaluation tendency determining portion 90 processes the above information as information with high priority.

Based on the emphasis tendency in sensory evaluation with regard to a phenomenon of the evaluation target, which is determined by the evaluation tendency determining portion 90, the shifting characteristic changing portion 92 changes the shifting characteristics of the automatic transmission 18 so as to satisfy the sensory evaluation. That is, the shifting characteristic changing portion 92 changes at least one of the rotating direction and a torque direction (i.e. a direction of torque axis) of the shifting pattern of the automatic transmission 18 so as to reduce the dissatisfaction felt by the vehicle occupant, which is indicated by the sensory evaluation, that is, improve the sensory evaluation.

Figure 7:
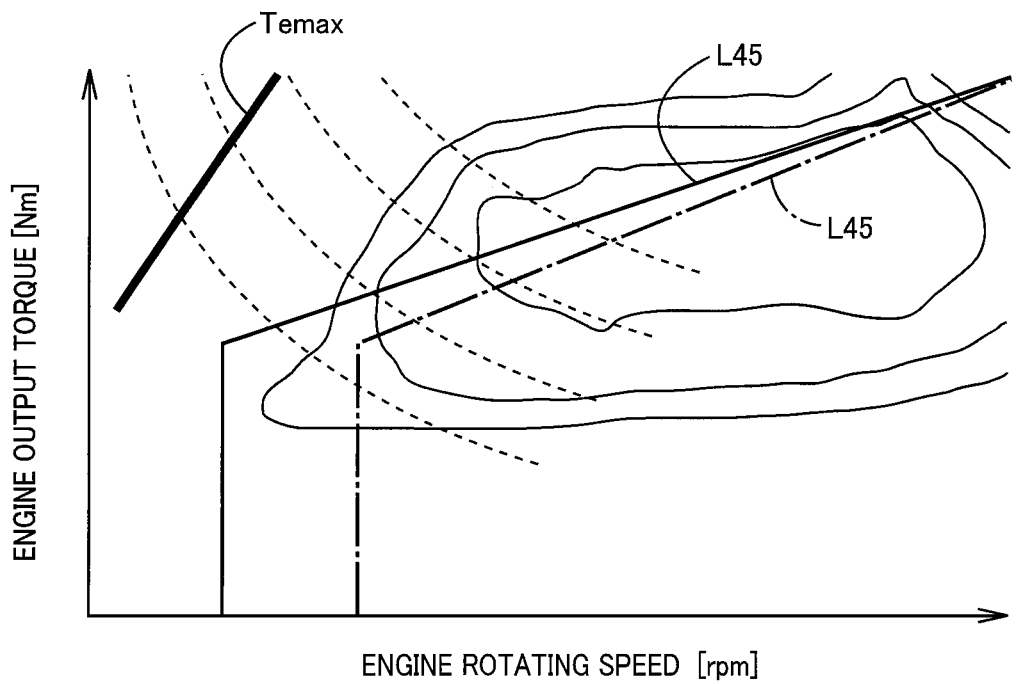
FIG. 7 is graph schematically showing an example in which the shifting characteristic changing portion of the electronic control apparatus in FIG. 1 has changed a shifting characteristic by a predetermined amount in the rotating direction.

FIG. 7 schematically shows an example of showing, in the two-dimensional coordinate system constituted by the engine rotating speed Ne (rpm) of the engine 14 and an output torque Te of the engine 14, a variogram L45 indicating a shifting from the fourth speed to the fifth speed of the automatic transmission 18, which is lowered by a predetermined amount in the rotating direction of the engine 14 from the variogram indicated by a chain line to the variogram indicated by the solid line.

Figure 8:
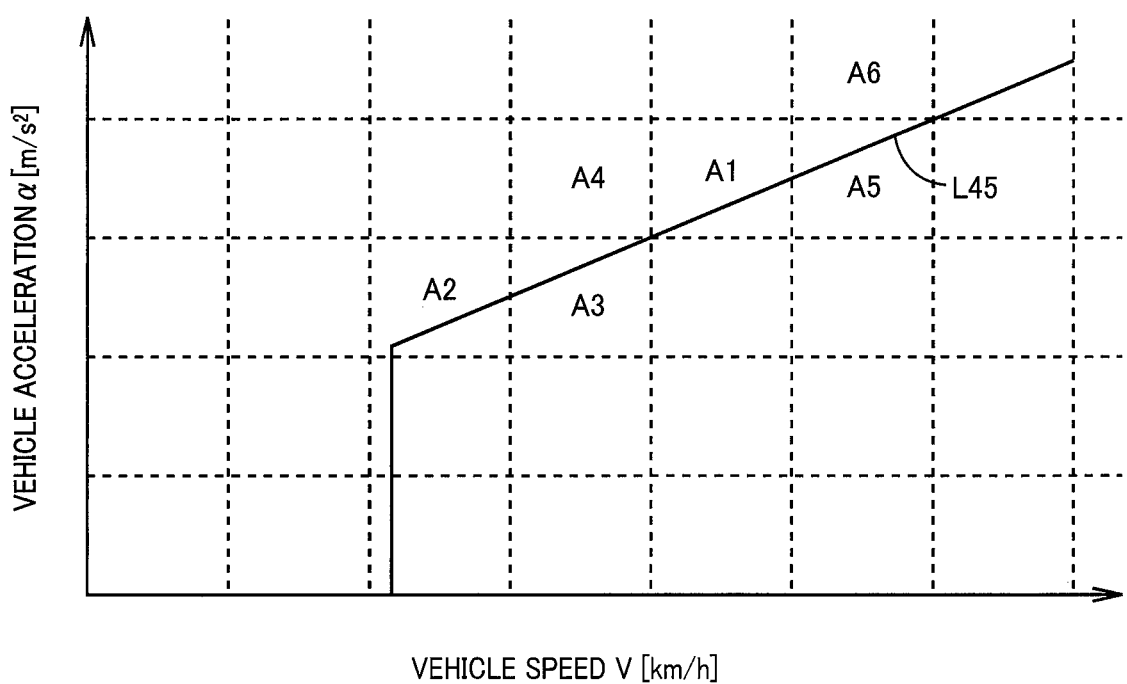
FIG. 8 is a graph for explaining how the electronic control apparatus in FIG. 1 sets a traveling region at the timing when shifting characteristic change control is activated as the change target region of a shifting pattern.

The shifting characteristic changing portion 92 stores the timing of activating shifting characteristic change control for changing the shifting characteristics of the automatic transmission 18 based on the input of a sensory evaluation by the vehicle occupant. As shown in FIG. 8, a traveling region at the timing is set as a change target region A1 of the shifting pattern, and the shifting pattern is changed from the variogram L45 in the change target region Al. FIG. 8 schematically shows the variogram L45 in the two-dimensional coordinate system constituted by the vehicle speed V (km/h) and a vehicle acceleration α (m/sec$^2$). The shifting patterns shown in FIGS. 7 and 8 and FIG. 9 (to be described later) are converted into normal variograms shown in FIG. 4 and used for shifting control in the shifting control unit 84.

Figure 9:
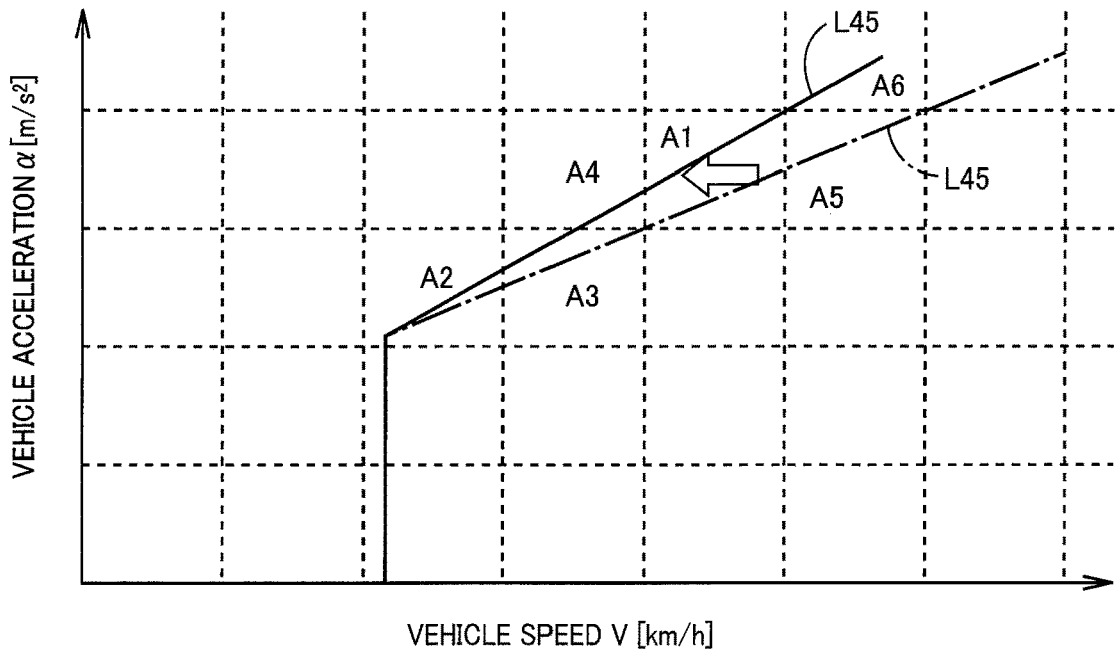
FIG. 9 is a graph for explaining a method of determining the amount of change in shifting characteristic by the shifting characteristic changing portion of the electronic control apparatus in FIG. 1.

The shifting characteristic changing portion 92 determines the amount of change in shifting characteristic (variogram) in the change target region A1 based on at least a determination history in the change target region A1 of the shifting pattern or determination histories in peripheral regions of the change target region A1, for example, peripheral regions A2 to A6, as shown in a schematic graph of FIG. 9. For example, the shifting characteristic changing portion 92 increases the amount of change within the change target region A1 of the shifting pattern more when the change to be made has the same tendency, for example, the change is made in the same direction, as compared with at least a determination history in the change target region A1 or determination histories in the peripheral regions A2 to A6 of the change target region A1 than when the changes have different tendencies.

The shifting characteristic changing portion 92 increases the amount of change in change characteristic more when the change direction of a change characteristic in the change target region A1 of the shifting pattern coincides with a direction of determination histories in the most common direction as compared with at least the determination history in the change target region A1 or determination histories in the peripheral regions A2 to A6 of the change target region A1 than when the directions differ from each other. In addition, the shifting characteristic changing portion 92 increases the amount of change in shifting characteristic in the change target region A1 of the shifting pattern more when there is no change history in the change target region A1 than when there are change histories in the peripheral regions A2 to A6 of the change target region A1.

Figure 10:
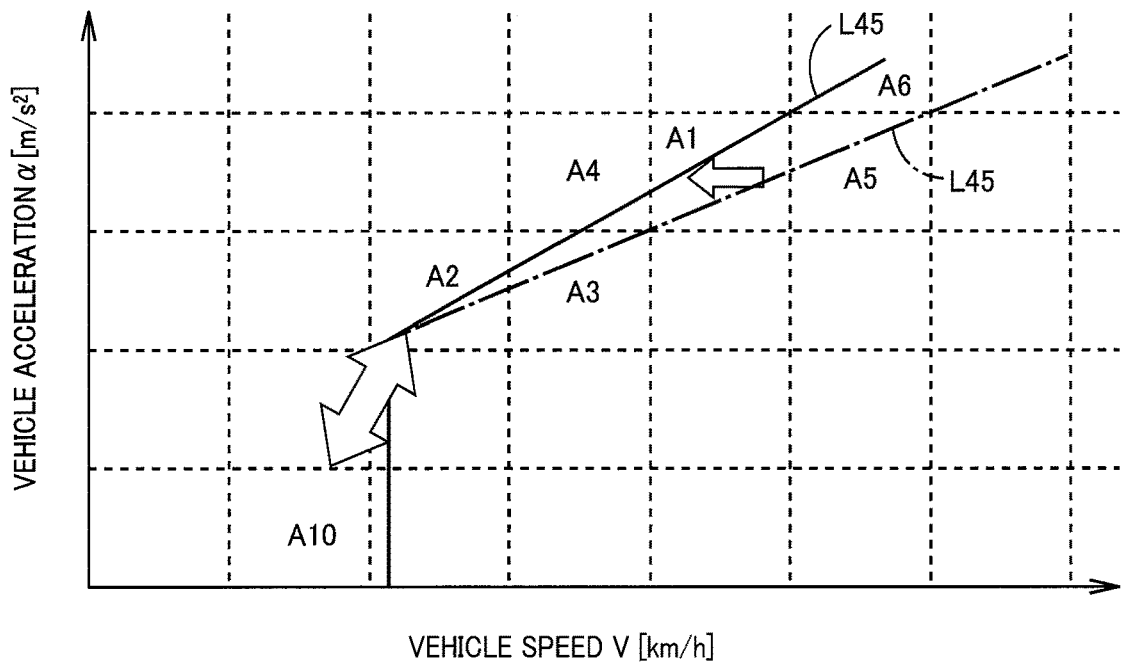
FIG. 10 is a graph for explaining a region in which the shifting characteristic changing portion of the electronic control apparatus in FIG. 1 executes a shifting characteristic change.

FIG. 9 schematically shows an example of, as shown in the two-dimensional coordinate system constituted by the vehicle acceleration α (m/sec$^2$) and the vehicle speed V (km/h), the variogram L45 indicating a shifting from the fourth speed to the fifth speed of the automatic transmission 18, which is increased by a predetermined amount in the torque direction of the engine 14 from the variogram indicated by the chain line to the variogram indicated by the solid line. The shifting characteristic changing portion 92 executes a change within the change target region A1 of the shifting pattern when a traveling region corresponding to the actual traveling of the vehicle shifts into a region spaced apart from the change target region A1 by one or more regions in the shifting pattern, for example, a region A10 in FIG. 10, or while the vehicle is stopped. The shifting control unit 84 executes the shifting of the automatic transmission 18 by using the shifting pattern changed by the shifting characteristic changing portion 92.

Figure 11:
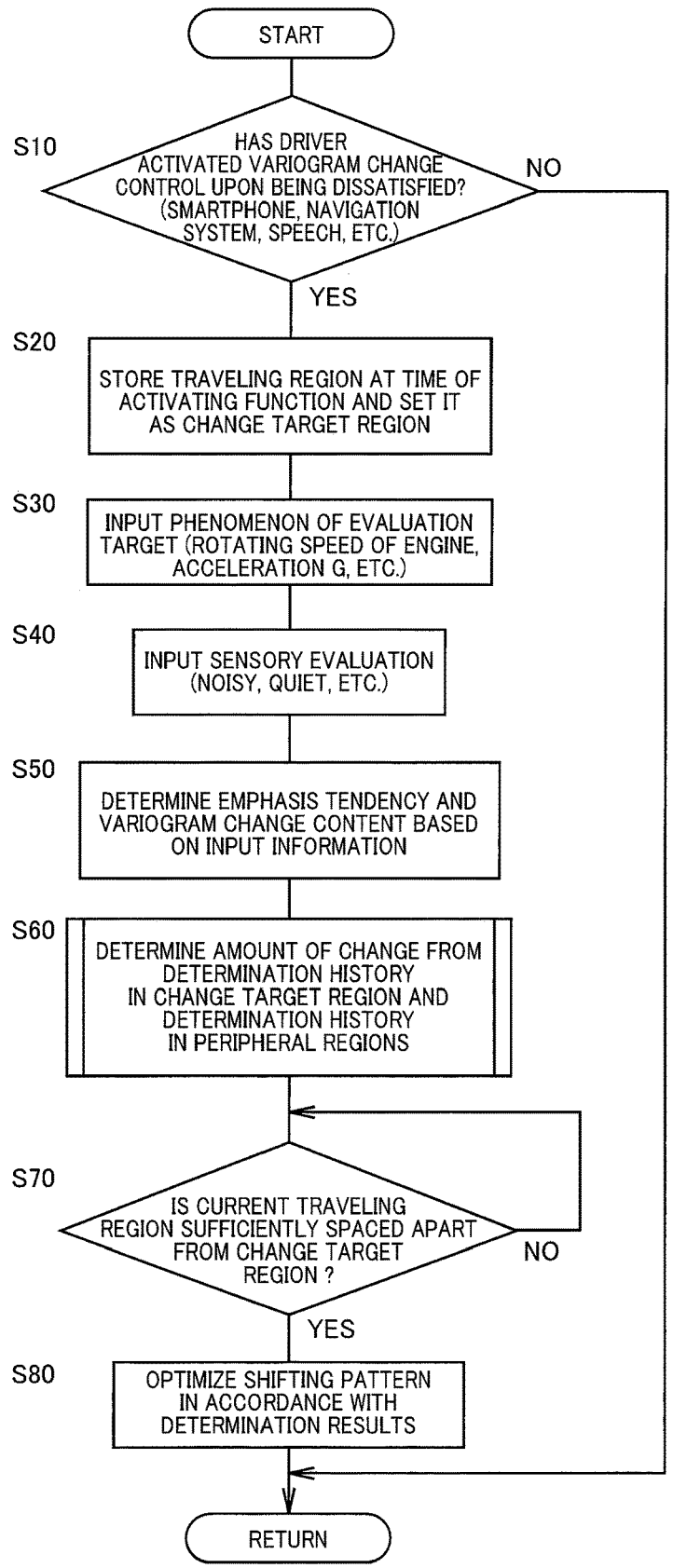
FIG. 11 is a flowchart for explaining the main part of the control operation of the electronic control apparatus in FIG. 1.
Figure 12:
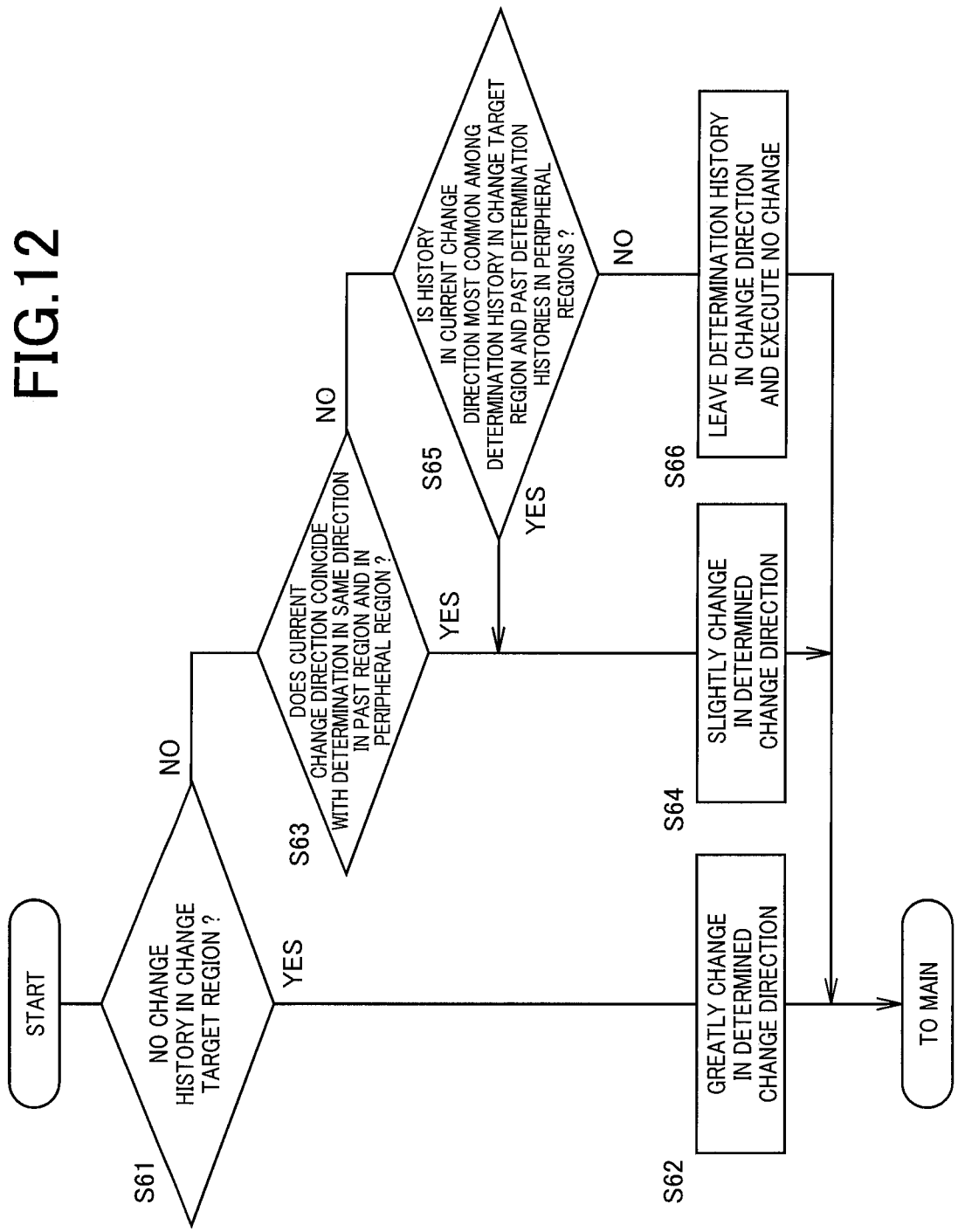
FIG. 12 is a flowchart for explaining in detail an operation of determining the amount of change in shifting characteristic in the electronic control apparatus in FIG. 1.

FIGS. 11 and 12 are flowcharts for explaining the main part of the control operation of the electronic control apparatus 80, i.e., a change control operation for the variogram for changing the shifting characteristics of the automatic transmission 18. This processing is repeatedly executed in a very short cycle of, for example, about several msec to about several tens msec.

First, in step S10 (the term "step" will be omitted hereinafter), it is determined whether the vehicle occupant, e.g., a driver, has felt dissatisfied with the fuel consumption, behavior, noise, vibration, etc., of the vehicle 10 and has activated variogram change control to change the variogram of the automatic transmission 18 so as to adjust the dissatisfaction. If NO is obtained in S10, this routine is terminated. If YES is obtained in S10, the change target region A1 corresponding to the traveling region at that time is stored in S20. Subsequently, in S30, the vehicle occupant, e.g., the driver, inputs and stores the evaluation target such as the engine 14, the automatic transmission 18, or the vehicle 10 and the corresponding phenomenon. In S40, the sensory evaluation with regard to the phenomenon is input and stored. S20, S30, and S40 described above function as the sensory evaluation input portion 88.

In S50 corresponding to the evaluation tendency determining portion 90, an evaluation emphasis tendency with regard to the evaluation target is determined based on an actual sensory evaluation according to a relationship shown in, for example, FIG. 6, and change content with regard to the rotating direction and torque direction of a variogram are determined. Subsequently, S60, S70, and S80 corresponding to the shifting characteristic changing portion 92 are executed.

In S60, the amount of change in shifting characteristic (variogram) in the change target region A1 is determined based on at least a determination history determined in a control cycle before the current control cycle in the change target region A1 of the shifting pattern or past determination histories in the peripheral regions A2 to A6 of the change target region A1, as shown in, for example, the schematic graph of FIG. 9. For example, the amount of change within the change target region A1 of the shifting pattern is set to be larger when the change direction coincides with that of at least a past change within the change target region A1 or past changes within the peripheral regions of the change target region A1 than when the change directions differ from each other. In addition, the amount of change in shifting characteristic in the change target region A1 is set to be larger when the change direction of shifting characteristics in the change target region A1 of the shifting pattern coincides with the direction of determination histories in the most common direction as compared with at least the determination history in the change target region A1 or the past determination histories in the peripheral regions of the change target region A1 than when the directions differ from each other. Furthermore, the amount of change within the change target region A1 of the shifting pattern is set to be larger when there is no change history in the change target region A1 than when there are past change histories in the peripheral regions of the change target region A1.

FIG. 12 is a flowchart showing in detail the main part of the operation of determining the amount of change in shifting pattern in S60. In S61 in FIG. 12, it is determined whether there is any change history in the change target region A1. If YES is obtained in S61, the amount of change in shifting pattern is changed more in the change direction in S62 than when there are past change histories in the peripheral regions of the change target region A1, and the determination history and the change history are left. If NO is obtained in S61, it is determined in S63 whether the change direction of the amount of change in shifting pattern determined currently coincides with that in the past and in the peripheral regions.

If YES is obtained in S63, the amount of change is changed less in the determined change direction in S64 than in S62, and the determination history and the change history are left. If NO is obtained in S63, it is determined in S65 whether the determination history in the same direction at this time is most common among the determination history in the change target region A1 and the past determination histories in the peripheral regions. If YES is obtained in S65, S64 is executed. If NO is obtained in S65, the determination history in the change direction at this time is left in S66, but the shifting pattern is not changed. That is, the amount of change within the change target region A1 of the shifting pattern is increased more when the determination history in the same change direction at this time (the case in S64 in this embodiment) is most common as compared with the past determination histories in the change target region A1 and the peripheral regions than when the determination history in the same change direction at this time is not most common (the case in S66 in which no change is executed in this embodiment).

Referring back to FIG. 11, it is determined in S70 whether the current traveling region is sufficiently spaced apart from the change target region A1, for example, by one or more regions. For example, referring to FIG. 10, it is determined whether the current traveling region is a sufficiently distant region. While NO is obtained in S70, S70 is repeatedly executed to stand by. If YES is obtained in S70, the amount of change in shifting pattern is changed in S80.

As described above, the electronic control apparatus (shifting control apparatus) 80 according to this embodiment is the electronic control apparatus 80 of the vehicle 10 including the automatic transmission 18 whose shifting positions are switched based on the shifting pattern stored in advance. The electronic control apparatus 80 includes the sensory evaluation input portion 88 that reads at least one sensory evaluation made by the vehicle occupant in the vehicle 10 with regard to traveling of the vehicle 10, the evaluation tendency determining portion 90 that determines the emphasis tendency in sensory evaluation with regard to a phenomenon of the evaluation target with which the vehicle occupant feels dissatisfied based on the sensory evaluation read by the sensory evaluation input portion 88, and the shifting characteristic changing portion 92 that changes the shifting characteristics of the automatic transmission 18 based on the emphasis tendency in sensory evaluation with regard to the phenomenon of the evaluation target determined by the evaluation tendency determining portion 90 so as to improve the sensory evaluation. This configuration changes the shifting characteristics of the automatic transmission 18 so as to reflect the intention of the vehicle occupant, for example, the driving intention of the driver.

According to the electronic control apparatus (shifting control apparatus) 80 according to this embodiment, the evaluation target is at least one of the engine 14 and the automatic transmission 18, which are mounted in the vehicle 10, and the vehicle 10, and a sensory evaluation is made with regard to at least one of the rotating speed and engine sound of the engine 14, the shifting timing of the automatic transmission 18, acceleration of the vehicle 10, and noise and vibration in the vehicle 10. Accordingly, the electronic control apparatus 80 changes the shifting characteristics of the automatic transmission 18 so as to reflect the driving intention of the driver with regard to at least one of the rotating speed and engine sound of the engine 14, the shifting timing of the automatic transmission 18, the acceleration of the vehicle 10, and noise and vibration in the vehicle 10.

According to the electronic control apparatus (shifting control apparatus) 80 according to this embodiment, the shifting characteristic changing portion 92 changes at least one of the rotating direction and the torque direction in the shifting pattern so as to improve the sensory evaluation, thereby changing the shifting characteristics of the automatic transmission 18 so as to reflect the intention of the vehicle occupant, e.g., the driving intention of a driver.

According to the electronic control apparatus (shifting control apparatus) 80 according to this embodiment, the shifting characteristic changing portion 92 determines the amount of change in shifting characteristic in the change target region A1 based on at least a determination history in the change target region A1 of the shifting pattern or past determination histories in the peripheral regions of the change target region A1, thereby changing the shifting characteristics of the automatic transmission 18 so as to reflect the intention of the vehicle occupant, e.g., the driving intention of a driver.

According to the electronic control apparatus (shifting control apparatus) 80 according to this embodiment, the shifting characteristic changing portion 92 makes the amount of change in shifting characteristic larger when the change direction of the shifting characteristics in the change target region A1 of the shifting pattern coincides with the direction of at least a past change within the change target region A1 or past changes within the peripheral regions of the change target region A1 than when the directions differ from each other, thereby changing the amount of change within the change target region A1 of the shifting pattern. This changes the shifting characteristics of the automatic transmission 18 so as to reflect the intention of the vehicle occupant, for example, the driving intention of the driver.

According to the electronic control apparatus (shifting control apparatus) 80 according to this embodiment, the shifting characteristic changing portion 92 makes the amount of change in shifting characteristic larger when the change direction of the shifting characteristics in the change target region A1 coincides with the most common direction in a determination history in the change target region A1 and past determination histories in the peripheral regions of the change target region A1 than when the directions differ from each other. This configuration changes the shifting characteristics of the automatic transmission 18 so as to reflect the intention of a vehicle occupant, for example, the driving intention of the driver.

According to the electronic control apparatus (shifting control apparatus) 80 according to this embodiment, the shifting characteristic changing portion 92 makes the amount of change in shifting characteristic in the change target region A1 of the shifting pattern larger when there is no change history in the change target region A1 than when there are past change histories in the peripheral regions of the change target region A1. This configuration changes the shifting characteristics of the automatic transmission 18 so as to reflect the intention of a vehicle occupant, for example, the driving intention of the driver.

According to the electronic control apparatus (shifting control apparatus) 80 according to this embodiment, the shifting characteristic changing portion 92 executes the change within the change target region A1 of the shifting pattern when the traveling region corresponding to actual traveling of the vehicle is spaced apart from the change target region A1 in the shifting pattern or while the vehicle is stopped. With this operation, a change in shifting pattern in the change target region A1 of the shifting pattern does not influence the traveling of the vehicle 10.

According to the electronic control apparatus (shifting control apparatus) 80 according to this embodiment, when a driver or the vehicle occupant operates the portable electronic information terminal device, the vehicle-mounted terminal device, or a vehicle-mounted speech input device, the sensory evaluation input portion 88 reads the sensory evaluation made by the driver or the vehicle occupant. This makes it possible for the sensory evaluation input portion 88 to easily read a sensory evaluation corresponding to the dissatisfaction felt by the vehicle occupant, e.g., a driver, with regard to the traveling of the vehicle 10.

Although the examples of the present invention are described in detail above with reference to the drawings, the present invention is also applied to other aspects of the present invention.

For example, the automatic transmission 18 according to the above embodiment is a planetary gear stepped automatic transmission. However, this automatic transmission may be an automatic transmission formed such that a variogram for switching between simulated shifting positions is set in advance so as to change stepwise the shifting ratio of a mechanical continuously variable transmission or electric continuously variable transmission, and the simulated shifting position is switched based on the variogram.

The automatic transmission 18 according to the above embodiment is the planetary gear stepped automatic transmission. However, this automatic transmission may be a constantly meshed parallel shaft type stepped automatic transmission whose shifting position is switched by an actuator based on a variogram set in advance.

According to the embodiment described above, there are 16 types of sensory evaluation items shown in FIG. 6. However, the number of sensory evaluation items may be smaller than 16 and may be, for example, one or more than 16. In addition, the embodiment described above includes a plurality of evaluation targets in the input information column, but may include one evaluation target.

In the embodiment described above, the shift map in FIG. 4 is formed from the two-dimensional map constituted by the vehicle speed V and the accelerator opening degree Acc. However, the vehicle speed V (km/h) on the abscissa may be replaced with, for example, the output rotating speed Nout (rpm) or the engine rotating speed Ne (rpm), and the accelerator opening degree Acc (%) on the ordinate may be replaced with the throttle valve opening degree θth (%), a required output Pre (kW), or the vehicle acceleration α (m/sec$^2$). In addition, S60 in FIG. 11 and S65 in FIG. 12 according to the embodiment described above use determination histories, but may use change histories instead of determination histories.

What has been described above is only an embodiment, and the present invention can be practiced based on the knowledge of a person skilled in the art in various aspects to which various modifications or improvements are added.

REFERENCE SIGNS LIST

10: vehicle
14: engine
18: automatic transmission (stepped automatic transmission)
80: electronic control apparatus (shifting control apparatus)
86: communication device
88: sensory evaluation input portion
90: evaluation tendency determining portion
92: shifting characteristic changing portion

What is claimed is:

1. A shifting control apparatus for a vehicle including a stepped automatic transmission configured to switch shifting positions based on a shifting pattern stored in advance, comprising:
   a sensory evaluation put portion configured to accept at least one sensory evaluation made by a vehicle occupant in the vehicle with regard to traveling of the vehicle;
   an evaluation tendency determining portion configured to determine an emphasis tendency in the sensory evaluation with regard to a phenomenon of an evaluation target with which the vehicle occupant feels dissatisfied based on the sensory evaluation accepted by the sensory evaluation input portion; and
   a shifting characteristic changing portion configured to change a shifting characteristic of the stepped automatic transmission based on the emphasis tendency in the sensory evaluation with regard to the phenomenon of the evaluation target determined by the evaluation tendency determining portion so as to improve the sensory evaluation,
   wherein the shifting characteristic chancing portion changes at least one of a rotating speed direction and a torque direction in the shifting pattern so as to improve the sensory evaluation made by the vehicle occupant.

2. The shilling control apparatus for the vehicle according to claim 1, wherein the evaluation target includes at least one of an engine, the stepped automatic transmission which are mounted in the vehicle, and the vehicle, and
   the sensory evaluation pertains to at least one of a rotating speed of the engine, an engine sound, a shifting timing of the stepped automatic transmission, an acceleration of the vehicle, noise in the vehicle, and vibration in the vehicle.

3. The shifting control apparatus for the vehicle according to claim 1, wherein the shifting characteristic changing portion determines, based on at least one of a determination history in a change target region of the shifting pattern and a determination history in a peripheral region of the change target region, an amount of change in the shifting characteristic in the change target region.

4. The shifting control apparatus for the vehicle according to claim 3, wherein the shifting characteristic changing portion makes an amount of change in the shifting characteristic larger when a change direction of the shifting characteristic in the change target region coincides with a change direction of past changes within the change target region and the peripheral region of the change target region than the amount of change when the directions differ from each other.

5. The shifting control apparatus for the vehicle according to claim 4, wherein the shifting characteristic changing portion executes a change within the change target region when a traveling region corresponding to actual traveling of the vehicle is spaced apart from the change target region or while the vehicle is stopped.

6. The shifting control apparatus for the vehicle according to claim 3, wherein the shifting characteristic changing portion makes an amount of change in the shifting characteristic larger when a change direction of the shifting characteristic in the change target region coincides with a most common direction in a determination history in the change target region and a determination history in the peripheral region of the change target region than when the directions differ from each other.

7. The shifting control apparatus for the vehicle according to claim 6, wherein the shifting characteristic changing portion executes a change within the change target region when a traveling region corresponding to actual traveling of the vehicle is spaced apart from the change target region or awhile the vehicle is stopped.

8. The shifting control apparatus fir the vehicle according to claim 3, wherein the shifting characteristic changing portion makes an amount of change in the shifting characteristic in the change target region larger when there is no change history in the change target region than when there is a change history in the peripheral region of the change target region.

9. The shifting control apparatus for the vehicle according to claim 8, wherein the shilling characteristic changing portion executes a change within the change target region when a traveling region corresponding to actual traveling of the vehicle is spaced apart from the change target region or while the vehicle is stopped.

10. The shifting control apparatus for the vehicle according to claim 3, wherein the shifting characteristic changing portion executes a change within the change target region when a traveling region corresponding to actual traveling of the vehicle is spaced apart from the change target region or while the vehicle is stopped.

11. A shilling control apparatus for a vehicle including a stepped automatic transmission configured to switch shifting positions based on a shifting pattern stored in advance, comprising:
   a sensory evaluation input portion configured to accept at least one sensory evaluation made by a vehicle occupant in the vehicle with regard to traveling of the vehicle;
   an evaluation tendency determining portion configured to determine an emphasis tendency in the sensory evaluation with regard to a phenomenon of an evaluation target with which the vehicle occupant feels dissatisfied based on the sensory evaluation accepted by the sensory evaluation input portion; and
   a shifting characteristic changing portion configured to change a shifting characteristic of the stepped automatic transmission based on the emphasis tendency in the sensory evaluation with regard to the phenomenon of the evaluation target determined by the evaluation tendency determining portion so as to improve the sensory evaluation
   wherein the shifting characteristic changing portion determines, based on at least one of a determination history in a change target region of the shifting pattern and a determination history in a peripheral region of the change target region, an amount of change in the shifting characteristic in the change target region.

12. The shilling control apparatus for the vehicle according to claim 11, wherein the evaluation target includes at least one of an engine, the stepped automatic transmission which are mounted in the vehicle, and the vehicle, and
   the sensory evaluation pertains to at least one of a rotating speed of the engine, an engine sound, a shilling timing of the stepped automatic transmission, an acceleration of the vehicle, noise in the vehicle, and vibration in the vehicle.

13. The shifting control apparatus for the vehicle according to claim 11, wherein the shifting characteristic changing portion makes an amount of change in the shifting characteristic larger when a change direction of the shifting characteristic in the change target region coincides with a change direction of past changes within the change target region and the peripheral region of the change target region than the amount of change when the directions differ from each other.

14. The shifting control apparatus for the vehicle according to claim 13, wherein the shifting characteristic changing portion executes a change within the change target region when a traveling region corresponding to actual traveling of the vehicle is spaced apart from the change target region or while the vehicle is stopped.

15. The shifting control apparatus for the vehicle according to claim 11, wherein the shifting characteristic changing portion makes an amount of change in the shifting characteristic larger when a change direction of the shifting characteristic in the change target region coincides with a most common direction in a determination history in the change target region and a determination history in the peripheral region of the change target region than when the directions differ from each other.

16. The shifting control apparatus for the vehicle according to claim 15, wherein the shifting characteristic changing portion executes a change within the change target region when a traveling region corresponding to actual traveling of the vehicle is spaced apart from the change target region or while the vehicle is stopped.

17. The shifting control apparatus for the vehicle according to claim 11, wherein the shifting characteristic changing portion makes an amount of change in the shifting characteristic in the change target region larger when there is no change history in the change target region than when there is a change history in the peripheral region of the change target region.

18. The shifting control apparatus for the vehicle according to claim 17, wherein the shifting characteristic changing portion executes a change within the change target region when a traveling region corresponding to actual traveling of the vehicle is spaced apart from the change target region or while the vehicle is stopped.

19. The shilling control apparatus for the vehicle according to claim 11, wherein the shifting characteristic changing portion executes a change within the change target region when a traveling region corresponding to actual traveling of the vehicle is spaced apart from the change target region or while the vehicle is stopped.

* * * * *